Dec. 3, 1946. W. A. LEDWITH 2,411,886
PISTON CONSTRUCTION
Filed Jan. 28, 1944 3 Sheets-Sheet 1

INVENTOR
Walter A. Ledwith
Charles Allawen
ATTORNEY

Dec. 3, 1946.   W. A. LEDWITH   2,411,886
PISTON CONSTRUCTION
Filed Jan. 28, 1944   3 Sheets-Sheet 3

INVENTOR
Walter A. Ledwith
Charles O. Warren
ATTORNEY

Patented Dec. 3, 1946

2,411,886

UNITED STATES PATENT OFFICE 2,411,886

PISTON CONSTRUCTION

Walter A. Ledwith, Hartford, Conn., assignor to United Aircraft Corporation, East Hartford, Conn., a corporation of Delaware Application January 28, 1944, Serial No. 520,063

14 Claims. (Cl. 123—176)

This invention relates to a piston construction particularly adapted for a free-piston engine-and-compressor unit.

Since the rate of reciprocation of the piston assembly in these units is partly dependent upon the weight of the piston assembly, high-speed units require extremely light weight pistons. A feature of this invention is a piston assembly which not only has the desired light weight but which is strong enough to withstand the stresses on the parts of the piston. These piston assemblies generally include an engine piston and an attached compressor piston with, in some cases, an attached sleeve forming a part of the air spring. Another feature of the invention is an arrangement for connecting these parts into an integral structure.

The engine piston of these units may be internally cooled to control the operating temperature. A feature of this invention is the arrangement of the piston assembly to provide for circulation of cooling fluid through the engine piston and the admission of cooling fluid to the piston. This arrangement may include an inner cup within the engine piston for keeping the fluid in contact with the inner wall of the piston or to minimize the volume of cooling fluid in the piston.

Other objects and advantages will be apparent from the specification and claims and from the accompanying drawings which illustrate an embodiment of the invention.

Figure 1:
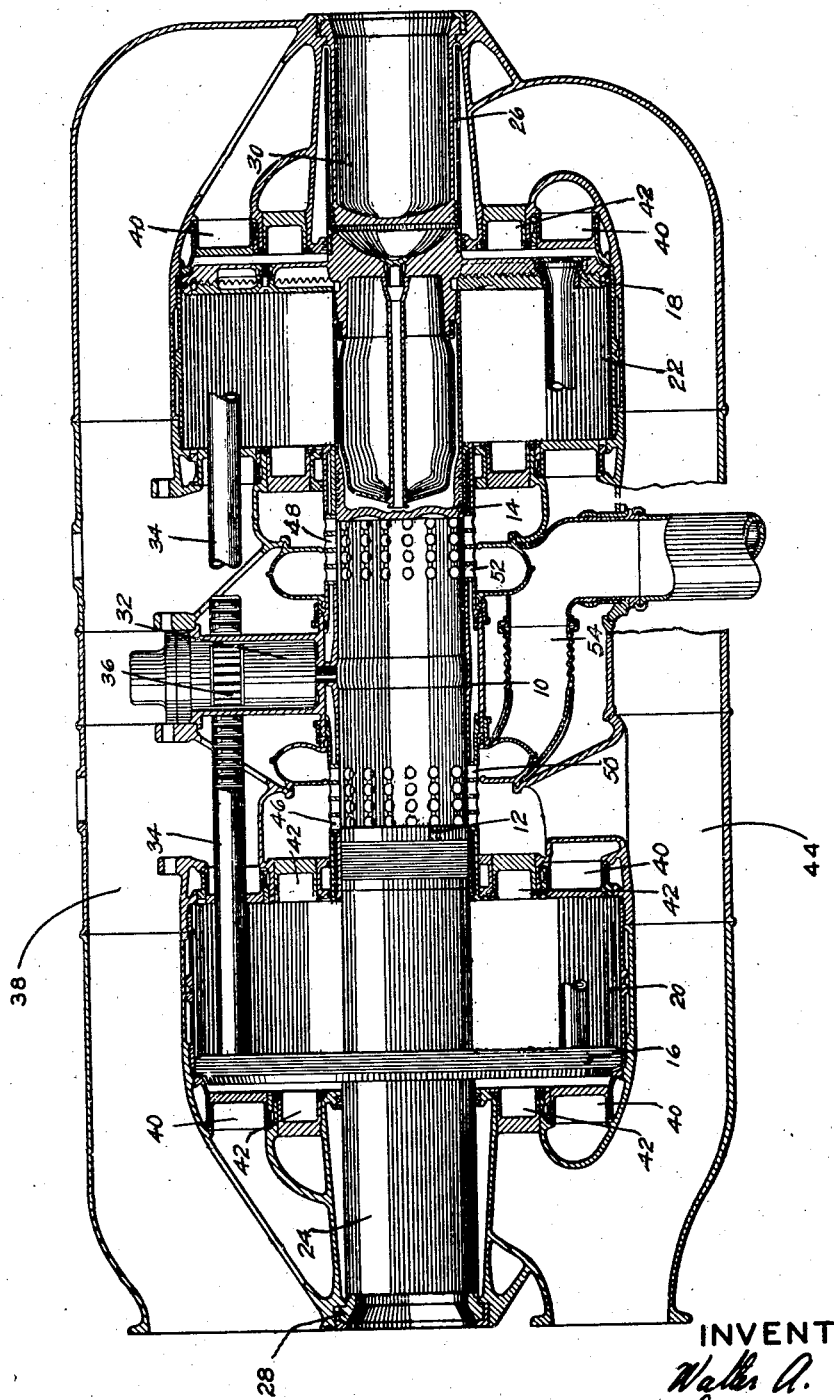
Fig. 1 is a sectional view through the engine-and-compressor unit.

The unit shown includes an engine cylinder 10 having reciprocating pistons 12 and 14 to which compressor pistons 16 and 18 in cylinders 20 and 22 are integrally connected. Sleeves 24 and 26 attached to the compressor pistons complete the reciprocating piston assemblies. The sleeves in combination with stationary pistons 28 and 30 form air spring cylinders.

The piston assemblies are moved apart by the burning of fuel injected into engine cylinder 10 as by a pump 32. Air compressed in the air spring cylinders on the power stroke returns the piston assemblies. The assemblies are always maintained at equal distances from the center of the engine cylinder by a linkage, which may include racks 34 on the compressor pistons meshing with a pinion 36.

Intake manifold 38 conducts air to intake valves 40 through which air alternately enters opposite ends of the compressor cylinders. The compressed air leaves the cylinders through discharge valves 42, also at opposite ends of the compressor cylinders and passes through scavenge manifold 44 and through ports 46 and 48 which are uncovered by pistons 12 and 14 at the end of the power stroke, thereby permitting air to be blown through the engine cylinder and exhaust ports 50 and 52 into exhaust manifold 54.

Figure 2:
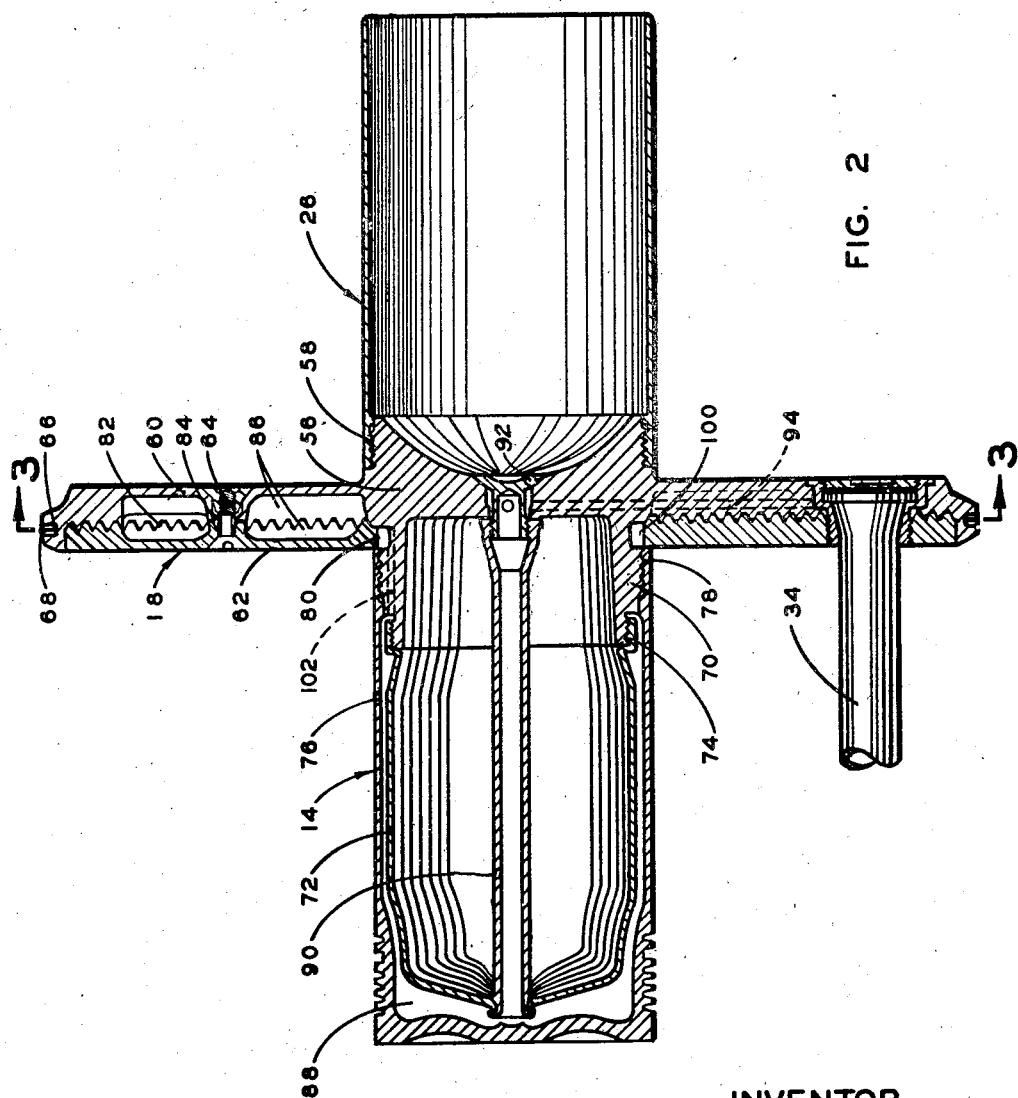
Fig. 2 is a sectional view through one piston assembly on a larger scale.

The piston assembly shown in Fig. 2 includes a base 56 to which the air spring sleeve 26 is attached as by cooperating threads 58 on sleeve and base. Base 56 has an integral disc 60 forming one side surface of the compressor piston 18. A cooperating disc 62 is fastened to disc 60 by bolts 64 to form the other side wall of the compressor piston. Disc 60 has a rim 66 within which disc 62 is fitted, this rim having a groove 68 for one or more piston rings.

Base 56 has a projecting hub 70 to the end of which a cup 72 is attached as by cooperating threads 74. This cup is positioned within and spaced from the hollow shell 76 which is held on the hub by interengaging threads 78 on hub and shell. The end of shell 76, which is adjacent the compressor piston, clamps the edge of disc 62 which has a central opening 80 through which hub 70 extends. Discs 60 and 62 may have interengaging shear serrations 82 on bosses 84 and ribs 86 to resist bending of the piston.

Sleeves 26, cup 72, and shell 76 may all be shrink fits on the base to hold the parts on assembled relations and to form a permanent assembly. The space 88 between cup 72 and shell 76 may be used for circulating coolant for the engine piston. A tube 90 extending centrally from base 56 to the end of the cup is held in the base by a hollow bolt 92 and admits coolant into space 88. Passage 94 in base 56 and integral disc 60 provides fluid connection from tube 90 to one hollow rack 34 into which fluid is pumped and through which coolant reaches the inside of shell 76.

Figure 3:
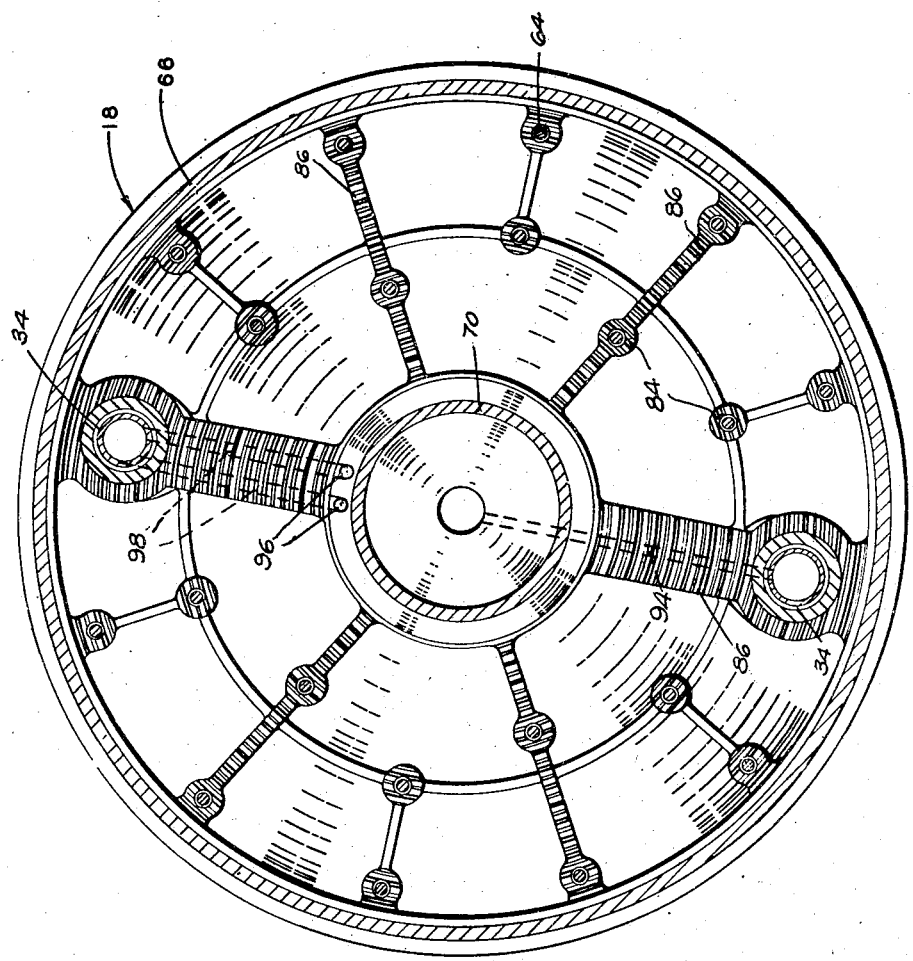
Fig. 3 is a sectional view on line 3—3 of Fig. 2.

Base 56 has intersecting passages 96 and 98, Fig. 3, extending from a groove 100 Fig. 2, in the hub 70 to the other hollow rack 34, for discharge of fluid from space 88 through the rack. Space 88 is connected with groove 100 by small passages 102, Fig. 2 in hub 70. All the fluid passages are in the base and integral hub and may be formed before the parts are assembled.

It is to be understood that the invention is not limited to the specific embodiment herein illustrated and described, but may be used in other ways without departure from its spirit as defined by the following claims.

I claim:

1. A piston construction including a compressor piston comprising opposed discs and an engine piston attached to one of said discs and clamping the discs together.

2. A piston construction including a compressor piston comprising opposed discs, and an engine piston threaded on one of said discs, and clamping the discs together.

3. A piston construction including a compressor piston comprising opposed discs, one of which has a hub extending through the other disc, and an engine piston threaded on said hub and clamping said other disc.

4. A piston construction including a compressor piston comprising opposed discs, one of which has a hub extending through the other disc, and an engine piston threaded on said hub and clamping said other disc, said hub having shoulders against which said other disc is clamped.

5. A piston construction including a compressor piston comprising opposed discs, one of which has a hub extending through the other disc, and an engine piston mounted on said hub and clamping said other disc.

6. A piston construction including opposed discs forming a piston, one of said discs having a hub extending through the other disc, and means threaded on said hub for clamping said other disc.

7. A piston construction including opposed discs forming a piston, one of said discs having a hub extending through the other disc, a second piston attached to said hub and clamping said other disc, and a sleeve on said hub on the side opposite to said second piston.

8. A piston construction including opposed discs forming a piston, one of said discs having a hub extending through the other disc, a second piston attached to said hub and clamping said other disc, said disc with the hub having a threaded projection on its opposite side to which another part of the piston construction may be attached.

9. A piston construction including opposed discs forming a piston, one of said discs having a hub extending through the other disc, a second piston attached to said hub and clamping said other disc, said disc with the hub having a threaded projection on its opposite side on which a sleeve is mounted.

10. A piston construction including a base, a liner mounted on said base, and a hollow piston mounted on said base around and out of contact with said liner.

11. A piston construction including a base, a liner mounted on said base, a tube extending from the outer end of the liner to a passage in the base, and a hollow piston mounted on said base around and out of contact with said liner.

12. A piston construction including opposed discs forming a piston, one of said discs having a hub extending through the other disc, a passage in said hub, a liner mounted on said hub and having a connection with said passage, and a hollow piston mounted on the hub around said liner and spaced therefrom to form a cooling space therebetween.

13. A piston construction including opposed discs forming a piston, one of said discs having a hub extending through the other disc, a passage in said hub, a liner mounted on said hub and having a connection with said passage, and a hollow piston mounted on the hub around said liner and spaced therefrom to form a cooling space therebetween, said hub having a passage from said cooling space to an opening in one of said discs.

14. A piston construction including opposed discs forming a piston, one of said discs having a hub extending through the other disc, a passage in said hub, a liner mounted on said hub and having a connection with said passage, and a hollow piston mounted on the hub around said liner and spaced therefrom to form a cooling space therebetween said piston clamping said discs together.

WALTER A. LEDWITH.